US010400685B2

(12) United States Patent
Won et al.

(10) Patent No.: US 10,400,685 B2
(45) Date of Patent: Sep. 3, 2019

(54) APPARATUS AND METHOD FOR CORRECTION OF INTAKE PULSATION

(71) Applicants: Hyundai Motor Company, Seoul (KR); Kia Motors Corporation, Seoul (KR)

(72) Inventors: Min-Kyu Won, Gyeonggi-do (KR); Hyung-Soo Do, Gyeonggi-do (KR); Soo-Hyeok Kang, Gyeonggi-do (KR); Dae-Woo Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 70 days.

(21) Appl. No.: 15/855,304

(22) Filed: Dec. 27, 2017

(65) Prior Publication Data

US 2019/0085775 A1    Mar. 21, 2019

(30) Foreign Application Priority Data

Sep. 18, 2017  (KR) .......................... 10-2017-0119416

(51) Int. Cl.
*F02D 41/00* (2006.01)
*F02D 41/14* (2006.01)
*F02D 41/18* (2006.01)

(52) U.S. Cl.
CPC ....... *F02D 41/0002* (2013.01); *F02D 41/144* (2013.01); *F02D 41/18* (2013.01); *F02D 2041/001* (2013.01); *F02D 2200/101* (2013.01)

(58) Field of Classification Search
None
See application file for complete search history.

(56) References Cited

U.S. PATENT DOCUMENTS

| 4,527,530 A * | 7/1985 | Abe ...................... F02D 41/187 |
| | | 123/494 |
| 6,349,592 B1 * | 2/2002 | Hirasawa .................. F01L 9/04 |
| | | 701/36 |
| 2003/0070494 A1 * | 4/2003 | Kanke ................... F02D 9/1035 |
| | | 73/861.19 |
| 2003/0230277 A1 * | 12/2003 | Muto .................. F02D 13/0234 |
| | | 123/308 |
| 2005/0065707 A1 * | 3/2005 | Kaga ..................... F02D 41/182 |
| | | 701/103 |
| 2005/0251317 A1 * | 11/2005 | Tanaka ...................... F01L 1/34 |
| | | 701/102 |

(Continued)

FOREIGN PATENT DOCUMENTS

KR    10-1998-0049076 A    9/1998
KR    2013-0063819 A    6/2013

*Primary Examiner* — Mark A Laurenzi
*Assistant Examiner* — Wesley G Harris
(74) *Attorney, Agent, or Firm* — Mintz Levin Cohn Ferris Glovsky and Popeo, P.C.; Peter F. Corless

(57) ABSTRACT

A method for correction of intake pulsation is provided. The method includes calculating a basic air charge amount of a cylinder or a charge amount conversion coefficient based on a measurement value of a sensor disposed in an intake system of an engine. A basic pulsation compensation coefficient for correcting an intake amount from a basic waveform of pulsation is calculated based on opening/closing of an intake valve and engine RPM. The basic pulsation compensation coefficient is then corrected when the basic waveform of the pulsation is changed.

18 Claims, 9 Drawing Sheets

(56) References Cited

U.S. PATENT DOCUMENTS

| | | | |
|---|---|---|---|
| 2006/0069492 A1* | 3/2006 | Muto | F02D 41/18 701/103 |
| 2006/0075996 A1* | 4/2006 | Yoshino | F01L 1/022 123/568.14 |
| 2006/0224298 A1* | 10/2006 | Lang | G01F 1/72 701/114 |
| 2013/0253802 A1* | 9/2013 | Miyamoto | F02D 43/04 701/103 |

* cited by examiner

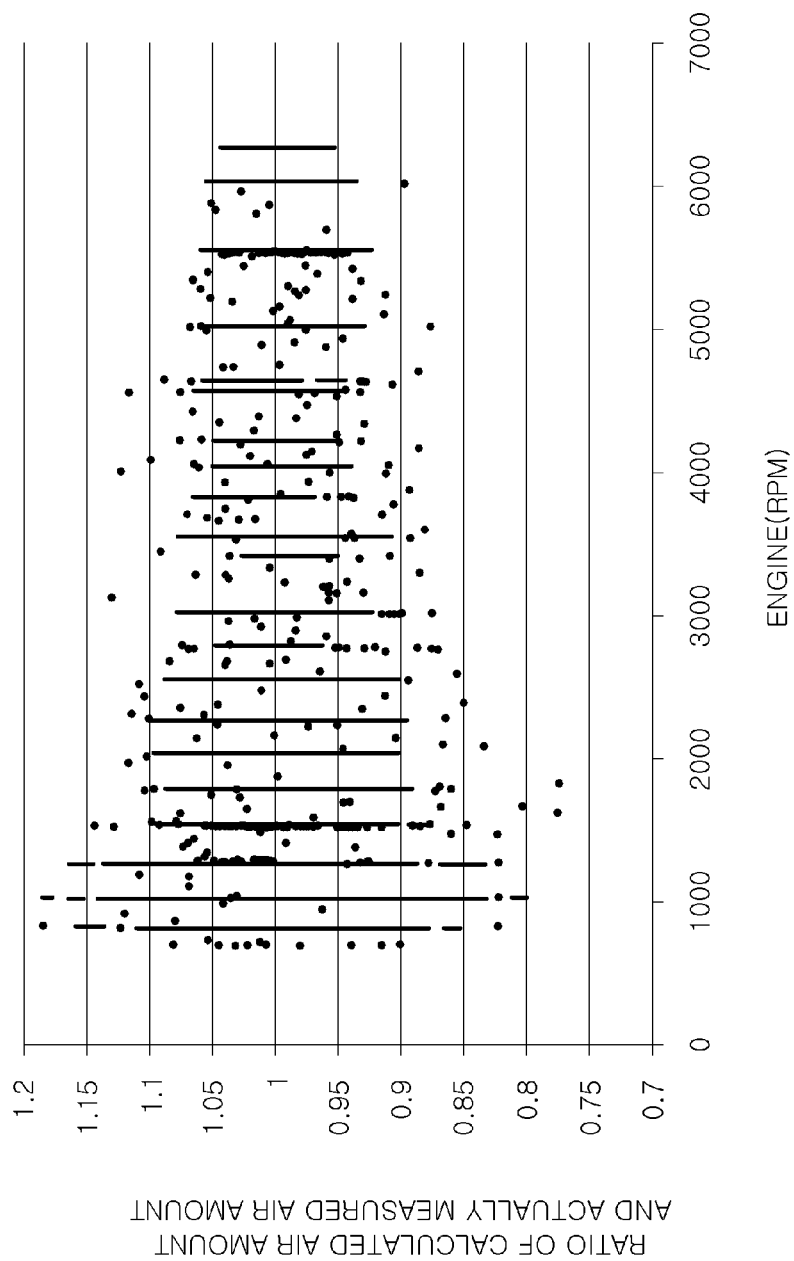

APPARATUS AND METHOD FOR CORRECTION OF INTAKE PULSATION

CROSS-REFERENCE TO RELATED APPLICATIONS

This application claims priority to Korean Patent Application No. 10-2017-0119416, filed on Sep. 18, 2017, which is incorporated herein by reference in its entirety.

BACKGROUND

Field of the Invention

The present invention relates to an apparatus and method for correction of intake pulsation and, more particularly, to an apparatus and method of compensating for intake pulsation generated in the intake system of an engine of a vehicle in consideration of factors influencing the intake pulsation.

Description of Related Art

The intake amount of a vehicle engine should be calculated accurately to improve the performance and fuel efficiency of the engine. Further, it is also an important factor to determine components of exhaust gas. In particular, fuel is injected in a gasoline engine to perform theoretical fuel-air ratio control based on the intake amount of an engine, and thus, an accurate calculation of the intake amount of the engine is important. When the intake amount of an engine is calculated greater than the actual value, fuel is injected excessive as much as the calculated amount, and thus, the fuel efficiency is reduced and noxious gases (CO and HC) are discharged. Further, in contrast, when the intake amount of an engine is calculated less than the actual value, fuel is injected less as much as the calculated amount, the output performance of the engine is deteriorated and noxious gases (NOx) are discharged.

Meanwhile, it is required to exactly compensate intake pulsation that is generated in an intake line to more accurately calculate the intake amount of an engine. FIG. 3 is a view showing the structure of an intake system including a cylinder 40 and valves 20 and 30 of an engine according to the related art. Intake air is collected in a surge tank through a throttle valve 10, and flows into a cylinder 40 while an intake valve 20 is open. In particular, the flow rate of the intake air is calculated using internal pressure of the cylinder that is calculated from the pressure of the surge tank measured by a manifold absolute pressure (MAP) sensor and exhaust pressure. The air flowing in the cylinder 40 is compressed, ignited, and burned in the cylinder 40 by downward movement of a piston 50, and then the air is discharged to an exhaust system through the exhaust valve 30.

Since air has a property (inertia) in which flow is maintained at the same speed, every time the intake valve 20 opens/closes, portions with high air density and low air density are formed at the intake valve. Accordingly, a wavelength of pulsation in which portions with high air density and low air density are continued is generated in an intake manifold when the intake valve 20 opens/closes. When air pulsation is generated in the intake manifold, the pressure of the intake system is fluctuated. Accordingly, when the intake amount is adjusted by an air flow rate sensor based on an air pressure change, the air flow rate sensor may malfunction due to pressure fluctuation, and thus, the intake amount is detected inaccurately. Therefore, systems or control methods for attenuating intake pulsation, as disclosed in Patent Document 1, have been disclosed in the related art.

SUMMARY

In the related art, simply in adhesion to the points of timing of opening/closing the intake valve 20 influencing pulsation, the conventional technique attempted to compensate for or suppress pulsation due to opening of the intake valve 20 based on the points of time. However, pulsation that is generated by opening/closing of the intake valve 20 may depend on the structure of valves disposed in the intake manifold. For example, when a variable intake system (VIS) or a variable charge motion (VCM) shown in FIG. 3 is applied together with the intake valve 20, the amplitude of pulsation due to opening of the intake valve changes, as described below. Accordingly, the waveform of the pulsation depend on whether the VIS or the VCM in the intake manifold operates, so unless the change is appropriately corrected, control for compensating for intake amount may become inaccurate.

Meanwhile, in valve-overlap in which both of the intake valve 20 and the exhaust valve 30 are open, exhaust pressure is usually greater than intake pressure, and thus, exhaust gas that has passed through the exhaust gas flows back to the intake valve 20. Accordingly, the waveform of intake pulsation is changed by exhaust pulsation of the exhaust gas even in the valve-overlap. Meanwhile, as a device for changing valve duration, a variable valve lift (VVL) that operates a valve with different lifts, based on engine revolutions per minutes (RPM), has been developed. When the lift of the intake valve 20 or the exhaust valve 30 is changed by the VVL, as shown in FIG. 5B, a valve profile to be controlled is changed. In FIG. 5B, the x-axis is an operation angle of a valve and the y-axis is a valve lift amount. As shown in FIG. 5B, when the valve lift amount is increased, an opening time point is advanced and a closing time point is retarded, and thus, the entire valve profile is changed.

Further, a continuously variable valve duration (CVVD) apparatus has been proposed to solve the problem with the VVL apparatus that when valve duration is changed, a valve lift is also changed. The CVVD apparatus, as shown in FIG. 5A, may effectively change the valve duration without changing the valve lift. In the example shown in FIG. 5A, using the CVVD apparatus, the valve duration is changed by fixing the valve opening time point and retarding the valve closing time point with the valve lift amount maintained. As shown in FIG. 5B, the valve profile may be changed. When the VVL apparatus or CVVD apparatus is applied, as described above, the behavior influencing intake pulsation and the tendency of valve-overlap are changed, which influences a pulse waveform.

As described above, whether valves in an intake system are operated or whether valve-overlap is generated has various influences on intake pulsation, but these influences were not considered in compensation of an intake amount considering intake pulsation. An exemplary embodiment of the present invention is directed to a control apparatus and method that more accurately adjust an intake amount by considering a waveform change of intake pulsation due to whether valves in an intake system are operated or due to valve-overlap when the waveform is changed.

Other objects and advantages of the present invention may be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method for correction of intake pulsation may include: calculating a basic air charge amount of a cylinder or a charge amount conversion coefficient based on a measurement value of a sensor disposed in an intake system of an engine; calculating a basic pulsation compensation coefficient for correcting an intake amount from a basic waveform of pulsation based on opening/closing of an intake valve and engine RPM; and correcting the basic pulsation compensation coefficient when the basic waveform of the pulsation is changed.

The correcting of a basic pulsation compensation coefficient may include: determining whether valve-overlap has occurred; and correcting the basic pulsation compensation coefficient based on a valve-overlap amount when valve-overlap has occurred. The correcting of a basic pulsation compensation coefficient may include: determining whether a variable induction system (VIS) valve disposed in the intake system is operated; and correcting the basic pulsation compensation coefficient based on whether the VIS valve is operated.

The correcting of a basic pulsation compensation coefficient may include: determining whether a variable charge motion (VCM) valve disposed in the intake system is operated; and correcting the basic pulsation compensation coefficient based on whether the VCM valve is operated. The correcting of a basic pulsation compensation coefficient may include: determining whether a valve lift is operated by a variable valve lift apparatus; and correcting the basic pulsation compensation coefficient, based on a control amount of the valve lift, when the valve lift is operated by the variable valve lift apparatus.

The correcting of a basic pulsation compensation coefficient may include: determining whether valve duration is adjusted by a continuously variable valve duration (CVVD) apparatus; and correcting the basic pulsation compensation coefficient, based on the amount of change in valve profile, when the valve duration is adjusted by the continuously variable valve duration apparatus. The correction of a basic pulsation compensation coefficient based on a change amount of the valve profile may correct the basic pulsation compensation coefficient, using a valve profile determined based on the maximum opening time point (MOP) of an intake or exhaust valve operated by the continuously variable valve duration apparatus and a valve closing time point.

The correction of a basic pulsation compensation coefficient based on a change amount of the valve profile may correct the basic pulsation compensation coefficient, using a valve profile determined based on the maximum opening time point (MOP) of an intake or exhaust valve operated by the continuously variable valve duration apparatus and a valve opening time point. The correction of a basic pulsation compensation coefficient based on a change amount of the valve profile may correct the basic pulsation compensation coefficient, using a valve profile determined based on an opening time point and a closing time point of an intake or exhaust valve operated by the continuously variable valve duration apparatus.

The correction of a basic pulsation compensation coefficient based on a change amount of the valve profile may correct the basic pulsation compensation coefficient, using a valve profile determined based on the valve duration and the maximum opening time point of an intake or exhaust valve operated by the continuously variable valve duration apparatus. The correction of a basic pulsation compensation coefficient based on a change amount of the valve profile may correct the basic pulsation compensation coefficient, using a valve profile determined as a function valve duration of an intake or exhaust valve operated by the continuously variable valve duration apparatus. The method may further include compensating for a basic air charge amount of the cylinder or a charge amount conversion coefficient, using the corrected basic pulsation compensation coefficient, and operating the intake system to satisfy the corrected basic air charge amount or charge amount conversion coefficient.

In accordance with another exemplary embodiment of the present invention, an apparatus for correction of intake pulse may include: a basic air charge amount calculator configured to calculate a basic air charge amount of a cylinder or a charge amount conversion coefficient based on a measurement value of a sensor disposed in an intake system of an engine; a basic pulsation compensation coefficient calculator configured to calculate a basic pulsation compensation coefficient for correcting an intake amount from a basic waveform of pulsation based on opening/closing of an intake valve and engine RPM; a basic pulsation corrector configured to correct the basic pulsation compensation coefficient when the basic waveform of the pulsation is changed; and an intake amount controller configured to compensate for a basic air charge amount of the cylinder or a charge amount conversion coefficient, using the basic pulsation compensation coefficient, and adjusting an intake amount of the intake system to satisfy the corrected basic air charge amount or charge amount conversion coefficient.

The basic pulsation corrector may be configured to correct the basic pulsation compensation coefficient based on a valve-overlap amount when valve-overlap has occurred. The basic pulsation corrector may be configured to correct the basic pulsation compensation coefficient, based on whether a VIS valve disposed in the intake system is operated. The basic pulsation corrector may be configured to correct the basic pulsation compensation coefficient, based on whether a VCM valve disposed in the intake system is operated. Additionally, the basic pulsation corrector may be configured to correct the basic pulsation compensation coefficient based on a valve lift control amount when a valve lift is operated by a variable valve lift apparatus. The basic pulse compensation coefficient may be corrected based on a change amount of a valve profile when valve duration is adjusted by a continuously variable valve duration apparatus.

According to the method and apparatus for correction of intake pulsation, when a waveform of intake pulsation is changed, based on whether valves in the intake system are operated or valve-overlap, it may be possible to more accurately compensate influence of pulsation on the intake amount by appropriately reflecting the change, and thus, it may be possible to more accurately supply a necessary amount of air to an engine. Therefore, according to the present invention, it may be possible to suppress excessive fuel supply to thus improve fuel efficiency. In addition, it may be possible to suppress that a smaller amount of fuel than the actually necessary amount of fuel is supplied, and thus, deterioration of engine power may be prevent. Further, it may be possible to prevent production of noxious exhaust gas.

BRIEF DESCRIPTION OF THE DRAWINGS

The above and other objects, features and other advantages of the present invention will be more clearly understood from the following detailed description when taken in conjunction with the accompanying drawings, in which:

FIG. 6A is a view showing a change in ratio between a calculated air amount and an actually measured air amount according to engine RPM in a comparative example.

DETAILED DESCRIPTION

Figure 1:
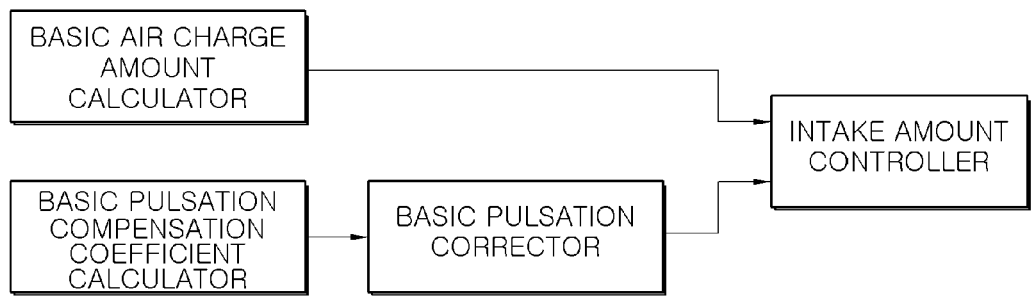
FIG. 1 is a block diagram showing the configuration of an apparatus for correction of intake pulsation according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described with reference to the accompanying drawings.

FIG. 1 is a block diagram showing the configuration of an apparatus for correction of intake pulsation according to the present invention. An apparatus for correction of intake pulsation according to an exemplary embodiment may include a basic air charge amount calculator, a basic pulsation compensation coefficient calculator, a basic pulsation corrector, and an intake amount controller. Each of the components of the apparatus may be operated by an overall controller having a processor and a memory.

In particular, the basic air charge amount calculator may be configured to calculate a basic air charge amount of a cylinder and a charge amount conversion coefficient based on a measure value of a sensor disposed in the intake system of an engine. In particular, the basic air charge amount calculator may be configured to calculate a charge amount of air in a combustion chamber of a cylinder during intake or determine a predetermined coefficient capable of being converted into a charge amount by measuring the capacity of the combustion chamber in the cylinder 40 and an intake flow rate or pressure supplied through an intake system using a sensor due to downward movement of the piston 50 when the intake valve 20 is closed. The basic pulsation compensation coefficient calculator may be configured to determine a basic waveform of pulsation generated by opening of the intake valve 20 and determine a basic pulsation compensation coefficient for correcting the charge amount or charge amount coefficient calculated by the basic air charge amount calculator based on the amplitude of the basic waveform of corresponding pulsation.

Figure 4A:
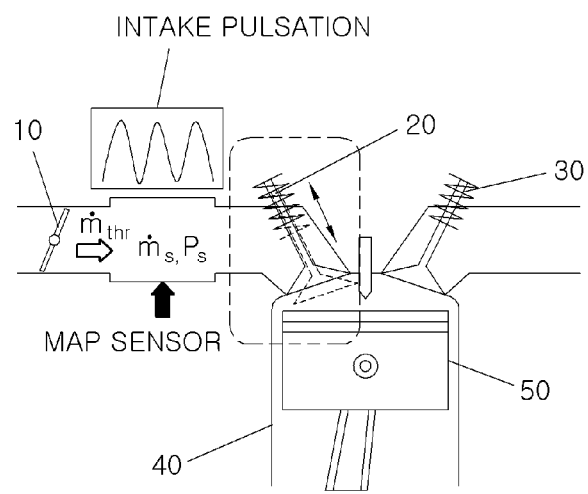
FIG. 4A is a view illustrating generation of intake pulsation when an intake valve is operated according to an exemplary embodiment of the present invention.

As shown in FIG. 4A, due to the inertia of air in which the flow is maintained at the same speed, every time the intake valve 20 is closed, a fluctuation flow repeating portions with high air density and low air density is produced in the intake valve. Further, the intake valve is operated a time per two revolutions of an engine, and thus, the basic waveform of pulsation is changed by the behaviors of the intake valve. The cycle of the pulsation in the basic waveform of pulsation may be determined by engine RPM and the amplitude of the pulsation of the basic waveform may be determined by the difference between pressures at the exhaust manifold and the intake manifold. The pressure of the intake manifold may be estimated from the intake amount that is measured, for example, by an MAP sensor shown in FIG. 4A. Alternatively, the pressure may be measured by providing a pressure sensor directly in the intake manifold. Further, the basic waveform of pulsation may use a value determined in advance based on the specifications of the intake valve and the length of the intake manifold in accordance with the engine RPM.

When the basic waveform of pulsation is determined in this way, a basic pulsation compensation coefficient may be determined in accordance with the determined amplitude of the pulsation to more accurately correct the intake amount. The basic pulsation compensation coefficient may be changed, based on the amplitude of pulsation, and as described below, the intake amount controller may be configured to correct the charge amount or the charge amount coefficient based on the basic pulsation compensation coefficient and adjust the intake amount based on the corrected charge amount or charge amount coefficient. The basic pulsation corrector may further be configured to correct the basic pulsation compensation coefficient and thus, when the basic waveform of pulsation is changed, the waveform may be reflected.

Figure 4B:
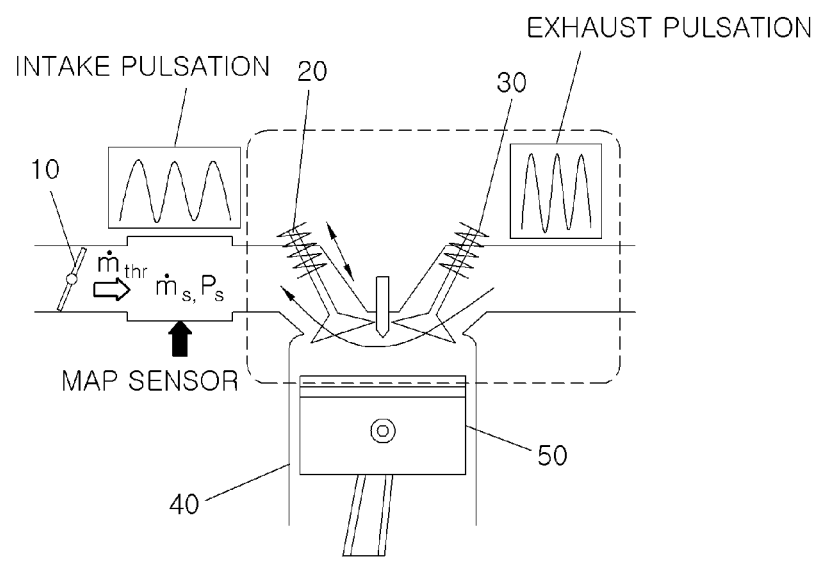
FIG. 4B is a view illustrating a change in intake pulsation when valve-overlap occurs according to an exemplary embodiment of the present invention.

FIG. 4B shows when valve-overlap occurs, as an example in which the basic waveform of pulsation may be changed. The valve-overlap refers to the state in which both of an intake valve and an exhaust valve are open, so in the valve-overlap, fresh air supplied through the intake port is directly guided (e.g., scavenged) to the exhaust port. Accordingly, guidance efficiency may be increased, and thus, the amount of remaining gas in a combustion chamber may be reduced, a charging efficiency of fuel may be increased and torque may be improved, so it is frequently used.

However, the exhaust pressure is usually greater than intake pressure in valve-overlap, so, as shown in FIG. 4B, exhaust gas that has passed through the exhaust valve 30 may flow backward to the intake valve 20. Accordingly, the exhaust pulse waveform influences the intake pulse waveform, and thus, the basic waveform is changed. The degree of influencing the amplitude of the basic wave in valve-overlap depends on the degree of the valve-overlap amount. The valve-overlap amount refers to the amount of area where the valve profile of the intake valve 20 and the valve profile of the exhaust valve 30 overlap each other in valve-overlap. Accordingly, the basic pulsation corrector may be configured to correct the basic pulsation compensation coefficient with a predetermined ratio, based on the degree of the valve-overlap amount.

The basic waveform of pulsation may be changed based on whether the valves in the intake system are operated, other than occurrence of valve-overlap. For example, the basic waveform of pulsation may be changed, based on whether a VCM valve or a VIS valve is operated, and thus, the basic pulsation corrector may be configured to correct the pulsation compensation coefficient, based on whether the VCM valve or the VIS valve is operated. A variable induction system is a system that increases engine power in all of operation periods from a low speed up to a high speed by automatically adjusting an air intake channel, based on revolutions (RPM) and overload of an engine.

Figure 3:
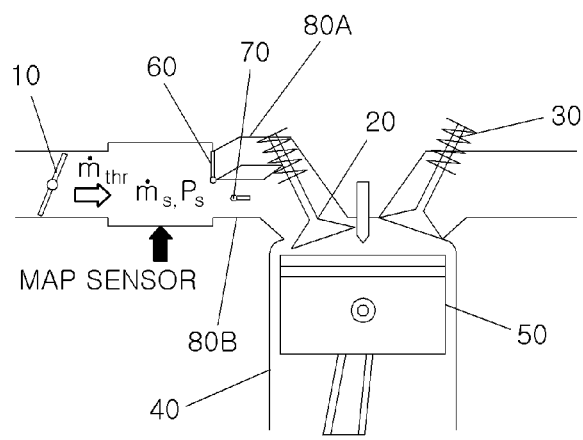
FIG. 3 is a view schematically showing the configuration of an intake system of an engine of a vehicle according to the related art.

For example, under a high speed and high load, the length of the intake system is reduced by closing a channel directing to a first runner 80A that is relatively long and by opening a channel directing to a second runner 80B that is relatively short, using the VIS valve 60 shown in FIG. 3, whereby the engine power may be improved. Further, under a low speed and low load, the length of the intake system is increased by closing the channel directing to the second runner 80B and opening the channel directing to the first runner 80A using the VIS valve 60, whereby the engine power may be improved.

As described above, when the VIS valve 60 is operated, the length of the intake system may be changed, and thus, the shape of the basic pulsation may also change. Accordingly, the basic pulsation corrector may be configured to correct the basic pulsation compensation coefficient with a predetermined ratio, based on whether the VIS valve 60 is operated and the corresponding change in length of the intake system.

Figure 4C:
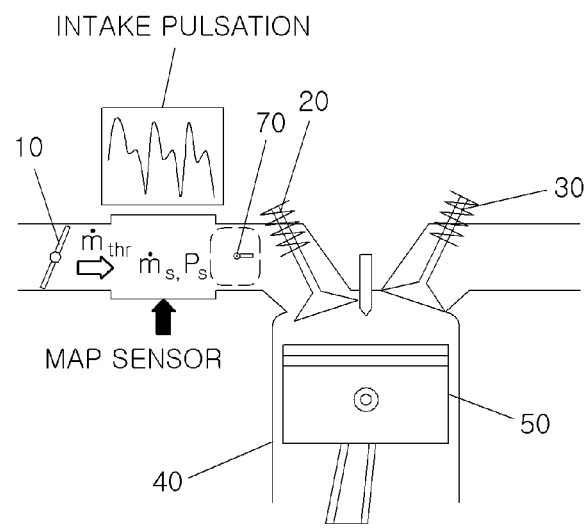
FIG. 4C is a view illustrating a change in intake pulsation when a VCM valve is operated according to an exemplary embodiment of the present invention.

Meanwhile, a variable charge motion (VCM) valve 70, as shown in FIG. 4C, may be disposed at the end of the intake manifold and may be opened or closed based on engine conditions. For example, when the VCM valve 70 is opened, intake air may be suctioned into a cylinder. When the VCM valve 70 is closed, the intake air may tumble and rapidly produce a gas mixture with fuel injected into the combustion chamber, and thus, fuel efficiency may be improved and the fuel may be completely burned, thereby reducing exhaust gas.

As described above, when the VCM valve 70 is operated, the flow of intake air is changed. As a result, the shape of the basic pulsation of the intake air may be changed. Accordingly, the basic pulsation corrector may be configured to correct the basic pulsation compensation coefficient through a map determined in advance based on whether the VCM valve 70 is operated.

Figure 5A:
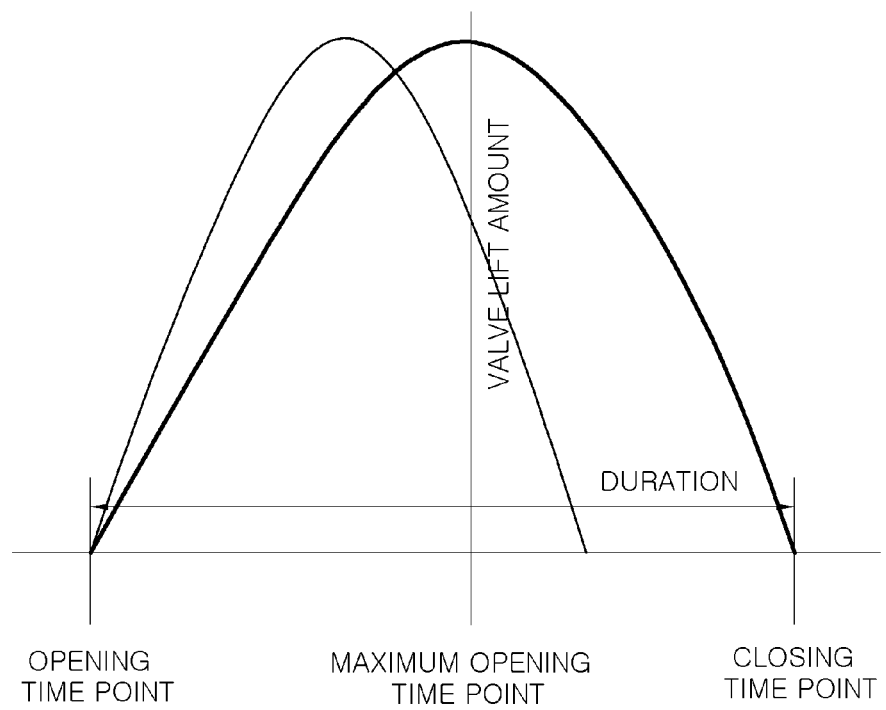
FIG. 5A is a view showing a change in valve profile when a valve lift is changed by a variable valve lift apparatus.
Figure 5B:
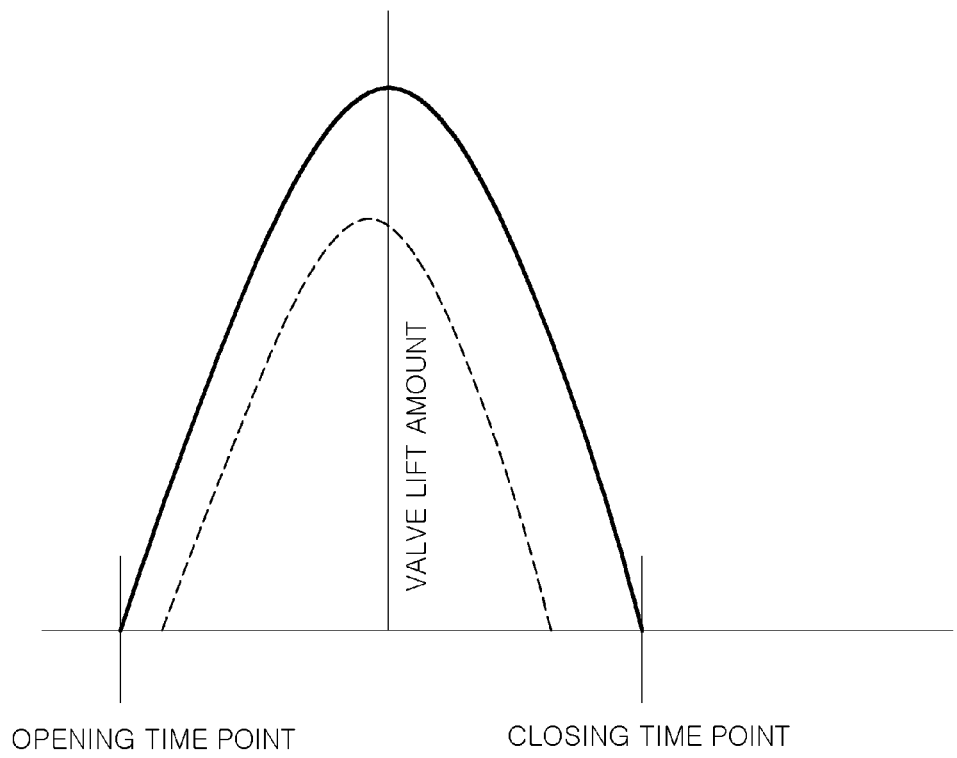
FIG. 5B is a view showing a change in valve profile when valve duration is changed by a continuously variable valve duration apparatus.

Meanwhile, as described above, when a valve lift is operated by a variable valve lift apparatus, as shown in FIG. 5B, the valve profile is changed, and thus, the waveform of the basic pulsation may be changed. The degree of change of the waveform of the basic pulsation may be determined as a function of the amount of change in valve lift. Accordingly, when the variable valve lift apparatus is applied, the basic pulsation corrector may be configured to correct the basic pulsation compensation coefficient through a map determined in advance based on the amount of change in valve lift by the variable valve lift apparatus.

Further, as described above, when valve duration is adjusted by a continuously variable valve duration apparatus, as shown in FIG. 5A, the valve profile may be changed, and thus, the waveform of the basic pulsation may be changed. Further, when the valve profile is changed, the effective open area of the valve may be changed. The degree of change in waveform of the basic pulsation may be determined as a function of the degree of change in valve profile (e.g., a change in effective open area of a valve). As described above, the valve profile when a valve is operated by a continuously variable valve duration apparatus may be determined by a change in valve duration.

Accordingly, the valve profile when a valve is operated by a continuously variable valve duration apparatus may be obtained as a predetermined function of the maximum opening time point of the valve and the closing time point of the valve adjusted by the continuously variable valve duration apparatus. Further, in another exemplary embodiment, the valve profile may be obtained as a predetermined function of the maximum opening time point of the valve and the opening time point of the valve adjusted by the continuously variable valve duration apparatus.

Further, in another exemplary embodiment, the valve profile may be obtained as a predetermined function of the opening time point of and the opening time point of the valve adjusted by the continuously variable valve duration apparatus. Alternatively, the valve profile may be obtained by determining the valve duration and the maximum opening time point of the valve adjusted by the continuously variable valve duration apparatus. Alternatively, a valve profile may be defined as a single function of the valve duration of the valve adjusted by the continuously variable valve duration apparatus, and the valve profile may be obtained from the valve duration value.

The intake amount controller may be configured to compensate for the basic air charge amount of the charge amount conversion coefficient calculated by the basic air charge amount calculator, using the basic pulsation compensation coefficient finally corrected by the basic pulsation corrector. Further, the controller may be configured to adjust the intake amount by operating a throttle valve 10 etc. such that the compensated basic air charge amount or charge amount conversion coefficient is satisfied. Accordingly, it may be possible to prevent malfunction of an intake air sensor due to intake pulsation and supply exact intake amount.

Figure 2A:
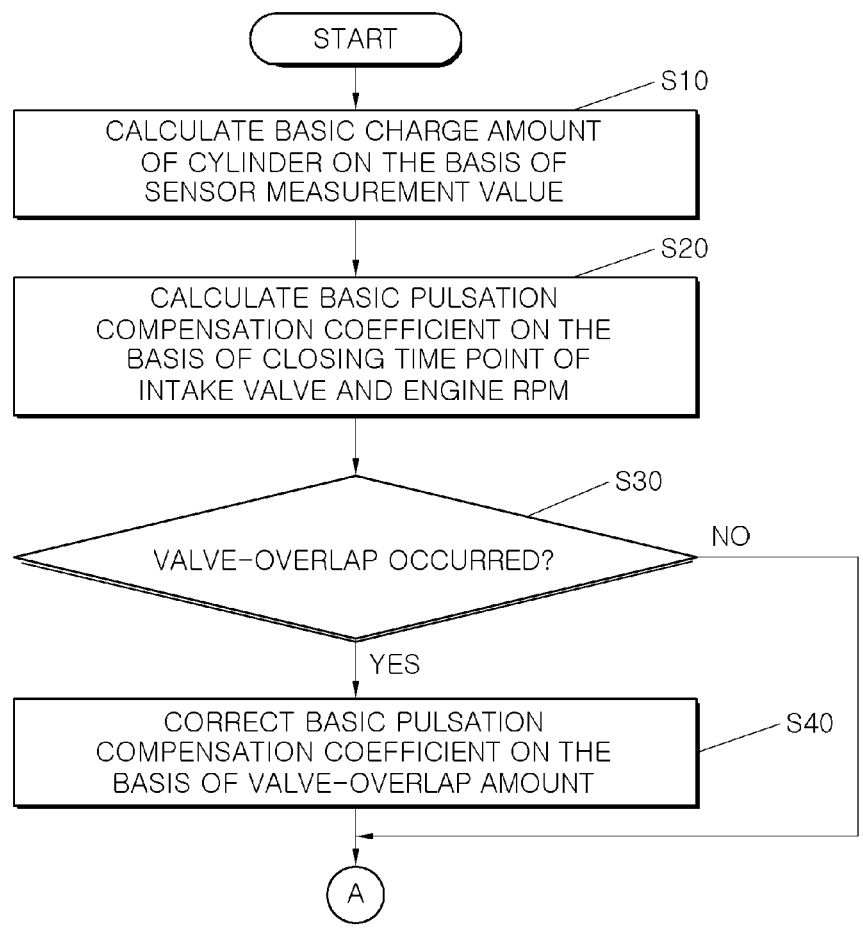
FIGS. 2A and 2B are a flowchart showing a method for correction of intake pulsation according to an exemplary embodiment of the present invention.
Figure 2B:
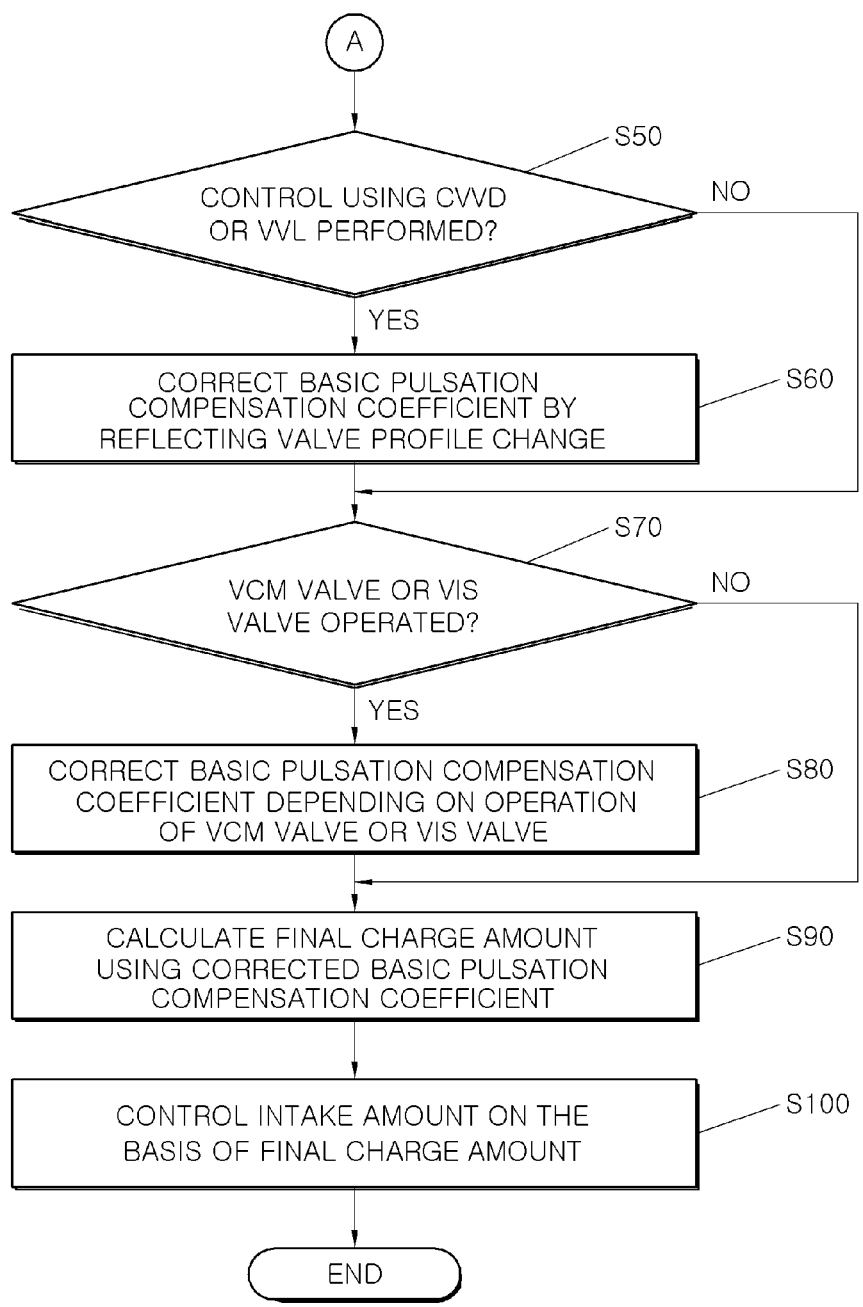

FIGS. 2 and 2B are a flowchart showing a method for correction of intake pulsation according to the present invention. As shown in FIGS. 2A and 2B, the basic air charge amount calculator, as described above with reference to FIGS. 2A and 2B, may be configured to calculate the basic air charge amount or the charge amount conversion coefficient of a cylinder based on a measurement value of a sensor disposed in the intake system of an engine (S10).

Further, the basic pulsation compensation coefficient calculator may be configured to calculate a basic pulsation compensation coefficient to correct an intake amount from the basic waveform of pulsation based on engine RPM and opening/closing of the intake valve, as described above with reference to FIG. 1. The basic pulsation corrector may then be configured to determine first whether valve-overlap has occurred to correct the basic pulsation compensation coefficient by reflecting valve-overlap when the valve-overlap occurs (S30). The valve-overlap refers to a state in which both of the exhaust valve 30 and the intake valve 20 are open due to an opening time point of the intake valve 20 exists before a closing time point of the exhaust valve 30. Accordingly, it may be possible to determine whether valve-overlap has occurred from the closing time point of the exhaust valve 30 to the opening time point of the intake valve 20.

In response to determining that valve-overlap has occurred, as described above with reference to FIG. 1, the basic pulsation compensation coefficient calculated by the basic pulsation compensation coefficient calculator may be corrected based on the valve-overlap amount (S40). In response to determining that there is no valve-overlap or when valve-overlap has occurred and the corresponding basic pulsation compensation coefficient finishes being corrected, the basic pulsation corrector may be configured to determine whether the basic pulsation is changed by determining whether the continuously variable valve duration (CVVD) apparatus or the variable valve lift (VVL) is operated (S50).

When the valve duration has been changed by the continuously variable valve duration (CVVD) apparatus, the basic pulsation corrector may be configured to calculate the degree of change in valve profile due to the change of the valve duration and again correct the basic pulsation compensation coefficient based on the degree of change, as described above. Further, even when the valve lift has been changed by the variable valve lift (VVL) apparatus, the basic pulsation corrector may be configured to again correct the basic pulsation compensation coefficient, as described above, based on the amount of change of the valve lift amount (S60).

Further, the basic pulsation corrector may be configured to determine whether the basic pulsation is changed by determining whether the VCM valve 60 or the VIS valve 70 is operated (S70). As described above, when the VIS valve 60 is operated, the length of the intake system may be changed, and thus, the shape of the basic pulsation may change. Accordingly, the basic pulsation corrector may be configured to again correct the basic pulsation compensation coefficient with a predetermined ratio, based on whether the VIS valve 60 is operated and the corresponding change in length of the intake system (S80).

As described above, when the VCM valve 70 is operated, the flow of intake air may be changed. As a result, the shape of the basic pulsation of the intake air may change. Accordingly, the basic pulsation corrector may be configured to again correct the basic pulsation compensation coefficient using a map determined in advance based on whether the VCM valve 70 is operated (S80). When the basic pulsation compensation coefficient is finally compensated through steps S30 to S80, the intake amount controller may be configured to compensate for the basic air charge amount or the charge amount conversion coefficient calculated in step S10, using the basic pulsation compensation coefficient finally corrected by the basic pulsation corrector (S90). Further, the controller may be configured to adjust the intake amount by operating a throttle valve 10 etc. such that the compensated basic air charge amount or charge amount conversion coefficient is satisfied (S100). In other words, the throttle valve 10 may then be operated based on the compensated basic air charge amount or charge amount conversion coefficient.

Figure 6B:
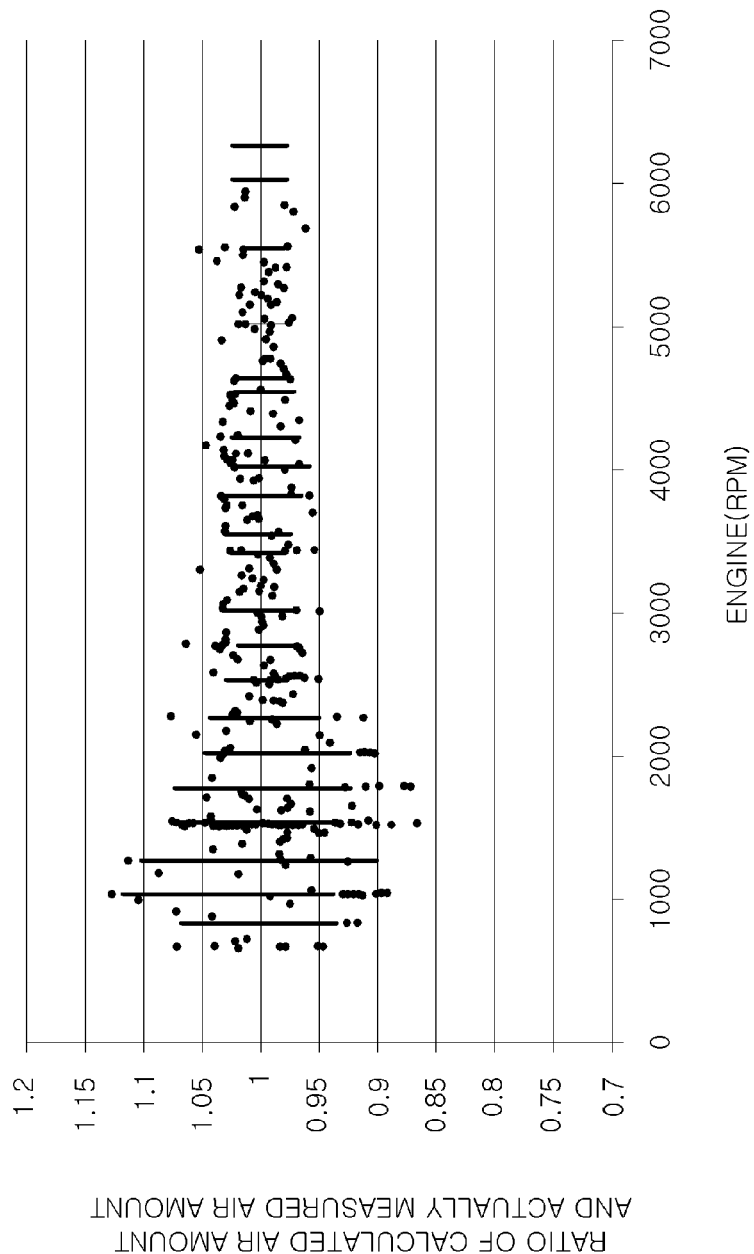
FIG. 6B is a view showing a change in ratio between a calculated air amount and an actually measured air amount according to engine RPM in an exemplary embodiment of the present invention.

FIGS. 6A and 6B are views showing a change in ratio between a calculated air amount (cylinder charge amount) and an actually measured air amount according to engine RPM. FIG. 6A shows the result of a comparative example when the method for correction of intake pulsation according to the present invention is not applied and FIG. 6B shows the result of an exemplary embodiment when the method for correction of intake pulsation according to the present invention is applied.

In the comparative example that calculated a cylinder charge amount without considering the influence by a basic pulsation waveform change since the method for correction of intake pulsation according to the present invention is not applied, the standard deviation of the calculated air amount/actually measured air amount was about 3.55%. Meanwhile, in the present exemplary embodiment that corrected a basic pulsation waveform change by applying the method for correction of intake pulsation according to the present invention, the standard deviation of the calculated air amount/actually measured air amount was abut 1.71%, so the difference could be reduced by about half.

As described above, according to the method and apparatus for correction of intake pulsation according to the present invention, when a waveform of intake pulsation is changed, based on whether valves in the intake system are operated or valve-overlap, it may be possible to more accurately compensate influence of pulsation on the intake amount by appropriately reflecting the change, and thus, it may be possible to more accurately supply a necessary amount of air to an engine.

Therefore, according to the present invention, it may be possible to suppress excessive fuel supply, so fuel efficiency may be improved. Further, it may be possible to suppress that a smaller amount of fuel than the actually necessary amount of fuel is supplied, to prevent deterioration of engine power. It may also be possible to prevent production of noxious exhaust gas.

What is claimed is:

1. A method for correction of intake pulsation, comprising:
   calculating, by a controller, a basic air charge amount of a cylinder or a charge amount conversion coefficient based on a measurement value of a sensor disposed in an intake system of an engine;
   calculating, by the controller, a basic pulsation compensation coefficient for correcting an intake amount from a basic waveform of pulsation based on opening or closing of an intake valve and engine revolutions per minute (RPM);
   correcting, by the controller, the basic pulsation compensation coefficient when the basic waveform of the pulsation is changed;
   correcting, by a controller, a basic air charge amount of the cylinder or a charge amount conversion coefficient, using a corrected basic pulsation compensation coefficient; and
   adjusting, by a controller, an intake amount of the intake system to satisfy a corrected basic air charge amount or charge amount conversion coefficient.

2. The method of claim 1, wherein the correcting of a basic pulsation compensation coefficient includes:
   determining, by the controller, whether valve-overlap has occurred; and
   correcting, by the controller, the basic pulsation compensation coefficient based on a valve-overlap amount when valve-overlap has occurred.

3. The method of claim 1, wherein the correcting of a basic pulsation compensation coefficient includes:
   determining, by the controller, whether a variable induction system (VIS) valve disposed in the intake system is operated; and
   correcting, by the controller, the basic pulsation compensation coefficient on the basis of whether the VIS valve is operated.

4. The method of claim 1, wherein the correcting of a basic pulsation compensation coefficient includes:
   determining, by the controller, whether a variable charge motion (VCM) valve disposed in the intake system is operated; and
   correcting, by the controller, the basic pulsation compensation coefficient on the basis of whether the VCM valve is operated.

5. The method of claim 1, wherein the correcting of a basic pulsation compensation coefficient includes:
   determining, by the controller, whether a valve lift is operated by a variable valve lift apparatus; and
   correcting, by the controller, the basic pulsation compensation coefficient, based on a control amount of the valve lift, when the valve lift is operated by the variable valve lift apparatus.

6. The method of claim 1, wherein the correcting of a basic pulsation compensation coefficient includes:
   determining, by the controller, whether valve duration is operated by a continuously variable valve duration (CVVD) apparatus; and
   correcting, by the controller, the basic pulsation compensation coefficient, depending on the amount of change in valve profile, when the valve duration is operated by the continuously variable valve duration apparatus.

7. The method of claim 6, wherein the correction of a basic pulsation compensation coefficient corrects the basic pulsation compensation coefficient, using a valve profile determined based on a maximum opening time point (MOP) of an intake or exhaust valve operated by the continuously variable valve duration apparatus and a valve closing time point.

8. The method of claim 6, wherein the correction of a basic pulsation compensation coefficient corrects the basic pulsation compensation coefficient, using a valve profile determined based on a maximum opening time point (MOP) of an intake or exhaust valve operated by the continuously variable valve duration apparatus and a valve opening time point.

9. The method of claim 6, wherein the correction of a basic pulsation compensation coefficient corrects the basic pulsation compensation coefficient, using a valve profile determined based on an opening time point and a closing time point of an intake or exhaust valve operated by the continuously variable valve duration apparatus.

10. The method of claim 6, wherein the correction of a basic pulsation compensation coefficient corrects the basic pulsation compensation coefficient, using a valve profile determined based on a valve duration and a maximum opening time point of an intake or exhaust valve operated by the continuously variable valve duration apparatus.

11. The method of claim 6, wherein the correction of a basic pulsation compensation coefficient corrects the basic pulsation compensation coefficient, using a valve profile determined as a function valve duration of an intake or exhaust valve operated by the continuously variable valve duration apparatus.

12. The method of claim 1, further comprising:
    compensating for, by the controller, a basic air charge amount of the cylinder or a charge amount conversion coefficient, using the corrected basic pulsation compensation coefficient; and
    operating, by the controller, the intake system to satisfy the corrected basic air charge amount or charge amount conversion coefficient.

13. An apparatus for correction of intake pulse, comprising:
    a basic air charge amount calculator configured to calculate a basic air charge amount of a cylinder or a charge amount conversion coefficient based on a measurement value of a sensor disposed in an intake system of an engine;
    a basic pulsation compensation coefficient calculator configured to calculate a basic pulsation compensation coefficient for correcting an intake amount from a basic waveform of pulsation based on opening or closing of an intake valve and engine revolutions per minute (RPM);
    a basic pulsation corrector configured to correct the basic pulsation compensation coefficient when the basic waveform of the pulsation is changed; and
    an intake amount controller configured to correct a basic air charge amount of the cylinder or a charge amount conversion coefficient, using a corrected basic pulsation compensation coefficient, and adjust an intake amount of the intake system to satisfy a corrected basic air charge amount or charge amount conversion coefficient.

14. The apparatus of claim 13, wherein the basic pulsation corrector is configured to correct the basic pulsation compensation coefficient based on a valve-overlap amount when valve-overlap has occurred.

15. The apparatus of claim 13, wherein the basic pulsation corrector is configured to correct the basic pulsation compensation coefficient, based on whether a variable induction system (VIS) valve disposed in the intake system is operated.

16. The apparatus of claim 13, wherein the basic pulsation corrector is configured to correct the basic pulsation compensation coefficient, depending on whether a variable charge motion (VCM) valve disposed in the intake system is operated.

17. The apparatus of claim 13, wherein the basic pulsation corrector is configured to correct the basic pulsation compensation coefficient based on a valve lift control amount when a valve lift is operated by a variable valve lift apparatus.

18. The apparatus of claim 13, wherein the basic pulse compensation coefficient is corrected based on a change amount of a valve profile when valve duration is adjusted by a continuously variable valve duration apparatus.

* * * * *